United States Patent
Jonsson et al.

(10) Patent No.: US 6,952,180 B2
(45) Date of Patent: Oct. 4, 2005

(54) METHOD AND APPARATUS FOR DETERMINATION OF POSITION

(75) Inventors: Sven Jonsson, Bollebygd (SE); Stefan Gudmundsson, Göteborg (SE)

(73) Assignee: Volvo Technology Corporation, Göteborg (SE)

( * ) Notice: Subject to any disclaimer, the term of this patent is extended or adjusted under 35 U.S.C. 154(b) by 68 days.

(21) Appl. No.: 10/248,759

(22) Filed: Feb. 14, 2003

(65) Prior Publication Data

US 2004/0160358 A1 Aug. 19, 2004

Related U.S. Application Data

(63) Continuation of application No. PCT/SE01/01730, filed on Aug. 14, 2001.

(30) Foreign Application Priority Data

Aug. 14, 2000 (SE) .............................................. 0002931

(51) Int. Cl.⁷ ............................................... G01S 5/14
(52) U.S. Cl. ............................. 342/357.05; 342/357.13; 701/206
(58) Field of Search ...................... 342/357.08, 357.13; 701/206

(56) References Cited

U.S. PATENT DOCUMENTS 4,642,776 A * 2/1987 Matsumoto et al. ........ 701/207
4,774,671 A * 9/1988 Itoh et al. .................... 701/208
6,278,938 B1 * 8/2001 Alumbaugh ................ 701/208
6,502,033 B1 * 12/2002 Phuyal ................... 342/357.13

FOREIGN PATENT DOCUMENTS

JP          03269317 A   * 11/1991   ........... G01C/21/00

OTHER PUBLICATIONS

English Translation of JP 03269317 A.*

* cited by examiner

Primary Examiner—Thomas H. Tarcza
Assistant Examiner—F H Mull
(74) Attorney, Agent, or Firm—Novak Druce & Quigg, LLP

(57) ABSTRACT

Method and apparatus for determination of positions of a moving object on the basis of a selection and storing a current position (Px) as a waypoint (Wx) if the following criteria are fulfilled: (1) the current distance (Dx) of the position (Px) along the road from the previous waypoint (Wx−1) is greater than a first parameter X; OR (2a) the current distance (Dx) of the position (Px) along the road from the previous waypoint (Wx−1) is greater than a second parameter Y, wherein Y<X, AND (2b) the deviation (Ax) between the current traveling direction of the object and the direction established by the connection of the last two waypoints (Wx−1, Wx−2) is greater than a third parameter Z, AND (2c) the speed of the object is greater than a minimum speed S. The stored waypoints allow a determination of the traveling direction which is advantageous for localization of vehicles driving on parallel one-way lanes.

11 Claims, 4 Drawing Sheets

METHOD AND APPARATUS FOR DETERMINATION OF POSITION

CROSS REFERENCE TO RELATED APPLICATIONS

This application is a continuation patent application of International Application No. PCT/SE01/01730, filed 14 Aug. 2001 which was published in English pursuant to Article 21(2) of the Patent Cooperation Treaty, and which claims priority to Swedish Application No. 0002931-4, filed 14 Aug. 2000. Both applications are expressly incorporated herein by reference in their entireties.

BACKGROUND OF INVENTION

1. Field of the Invention

The invention relates to a method and apparatus for determination of position of a moving object like a vehicle, airplane, ship, especially along a predetermined path or route.

2. Background of the Invention

Navigation systems for determination of position by means of the GPS (Global Positioning System) are well known not only for application in airplanes and ships, but have an increasing importance also for localization of a vehicle position.

Vehicular use requires receiver and evaluation units of compact size and reasonable costs. Further, for reducing communication times and communication costs, the data are condensed as much as possible, however, this is limited by the fact that the data have to be significant enough for determination of the vehicle position with sufficient accuracy.

WO 95/13594 discloses a device for recording information about a vehicle's itinerary. The device includes a receiver for receiving position data of the vehicle and a memory device for continuously storing position data, data on times of positions and data that identifies the driver of the vehicle on an easily replaceable data carrier.

WO 00/34932 discloses a monitoring system for automatically tracking the positions of a fleet of mobile units. Each mobile unit carries a position determining means, a processing means, and a transmitting means for sending the latest position of the mobile unit to a central control unit at certain intervals. For reducing the required transmission capacity, the processing means stores a number of rules for determining the interval between transmission of position update messages to the central control unit. These rules are based upon various factors like the direction of travel of the mobile unit, its location or distance from predetermined and stored other locations or a predetermined line defining the route or the required positional accuracy or other predetermined conditions or events.

WO 00/10027 discloses a position monitoring method and apparatus for mobile units in which current position data is transmitted to a central control unit periodically or each time the unit has moved a predetermined distance. The positions are displayed on an electronic map in a variety of selectable ways.

U.S. Pat. No. 5,598,167 discloses a method and apparatus for determining an actual position of a vehicle and for recurrently and wirelessly transmitting the same to a remote station. For restricting the number of transmissions, a discrete internal change of status (e.g. a predetermined traveled distance) is detected in the vehicle and transmission is effected upon detection of such a status change.

SUMMARY OF INVENTION

It is an object of the invention to provide a method and apparatus for determining the position of a moving object which is very simple to implement and which requires only minor expense for hardware equipment.

It is another object of the invention to provide a method and apparatus for determining the position of a moving vehicle which allows a substantially exact determination of its position even with respect to two parallel one-way lanes on a highway.

It is another object of the invention to provide a simple method and apparatus for selecting position data of a moving object as waypoints to be stored and displayed so that a reduced number of waypoints describe a traveled route with better accuracy and reduced error, especially in case of very different curved and straight courses, as well as different velocities of the object.

By this, the decision about storing position data as a (new) waypoint is made on the basis of, and in dependence of, previously stored waypoints and not on every previous position data. Using (only) the waypoints for indicating and/or displaying the traveled route, a higher accuracy of the description of the traveled route with a reduced data volume is achieved.

BRIEF DESCRIPTION OF DRAWINGS

Further details, features and advantages become apparent from the following description of a preferred embodiment of the invention with reference to the following drawings.

DETAILED DESCRIPTION

Figure 1:
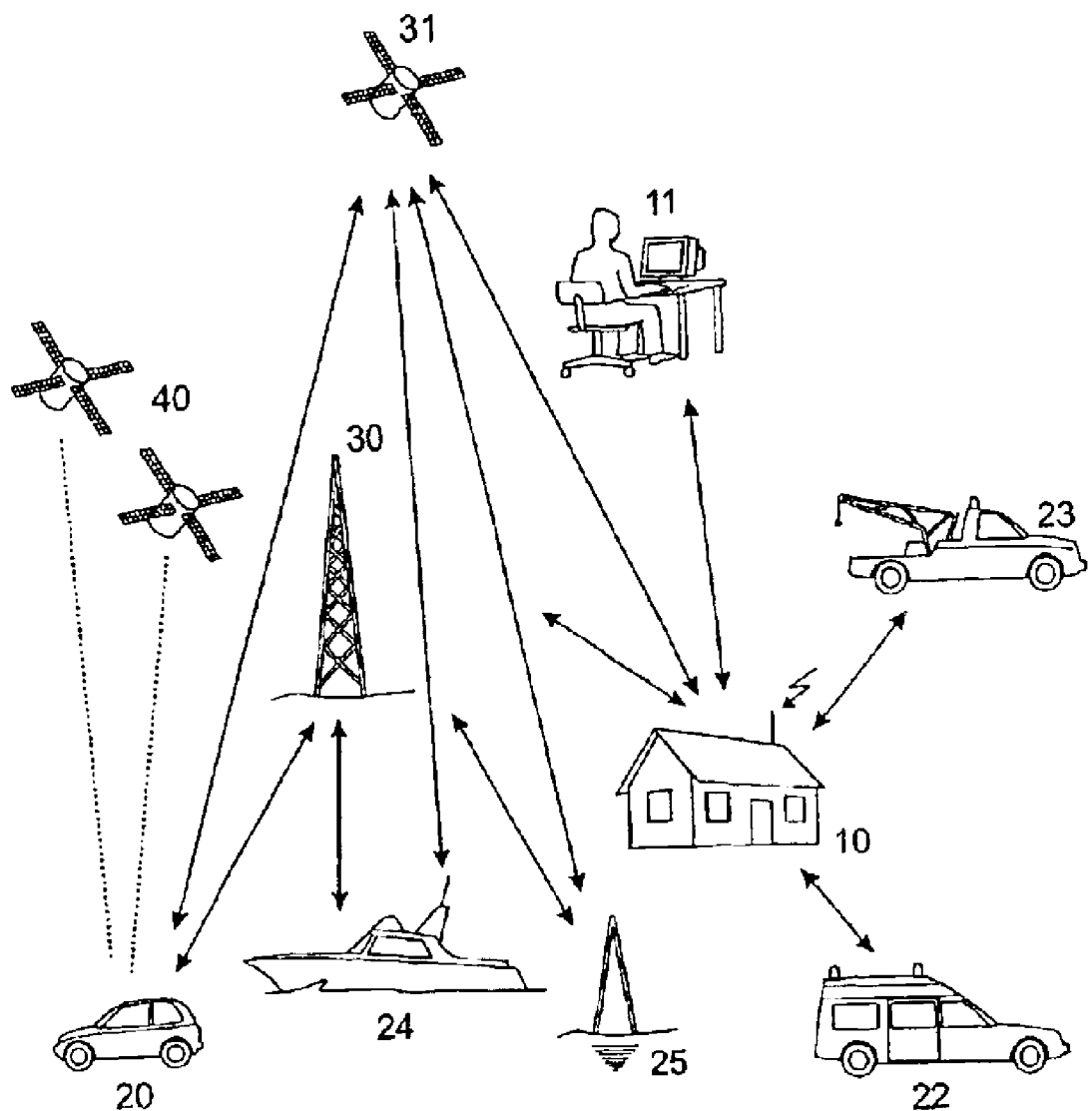
FIG. 1 is a schematic diagram of an exemplary environment in which the method and apparatus of the present invention can be implemented.

A preferred environment of the inventive method and apparatus of the present invention is exemplarily shown in FIG. 1. The environment includes a customer service center 10 with an operator 11. At least one vehicle 20, at least one boat or ship 24, as well as one or more stationary pieces of equipment 25 or equipment locations 25 such as a remote facility or plant that communicates with the service center 10 via a cellular communication network 30 like GSM (European standard) or AMPS (US standard) and/or a satellite communication network 31, both for exchanging of information, data and voice communication, each in both directions. Even software programs can be transmitted if necessary.

Emergency assistance vehicles 22 and a roadside assistance vehicle 23 communicate with the service center 10 in a similar manner or in any other way and are activated by the service center in case of need by one of the objects 20, 24, 25. A position of each object can be detected by means of a global positioning system (GPS) 40.

Vehicles, especially trucks, which are guided or monitored by the service center, are equipped with appropriate transmitting means for transmitting position data to the service center.

In case of accident or emergency, if an assistance vehicle 23 is needed, the driver of the same must exactly know the actual position of the vehicle which is calling for help, especially if such vehicle was driving on a highway or road with separated lanes for each direction. The indication of the position by means of GPS is normally not good enough to allow a distinction between two parallel one-way lanes (one for each direction) and an indication on which lane the target vehicle was traveling.

The method and apparatus according to the invention allows such distinction and indication by determining not only the position, but also the direction of movement of the object. This is achieved on the basis of a series of certain previously localized positions which are selected under certain criteria and stored in a corresponding memory as waypoints and which are transmitted if necessary to the service center or an assistance car. In this way, an actual position of the object, as well as its route of travel prior to that position, and consequently its moving direction, can be determined. This allows a determination (decision) regarding the lane in which the target object or vehicle is located.

The position of the object is determined, for example every second in a known manner by evaluating GPS signals. However, for saving memory and reducing processor demands, communication costs and communication times, only selected position data are stored in a memory and transmitted if necessary as waypoints along the traveled route. The transmission of position data can either be automatically initiated in case of an accident, initiated from the service center, or it can be manually initiated at the object, for instance, by an operating a switch engaged by an operator.

Figure 2:
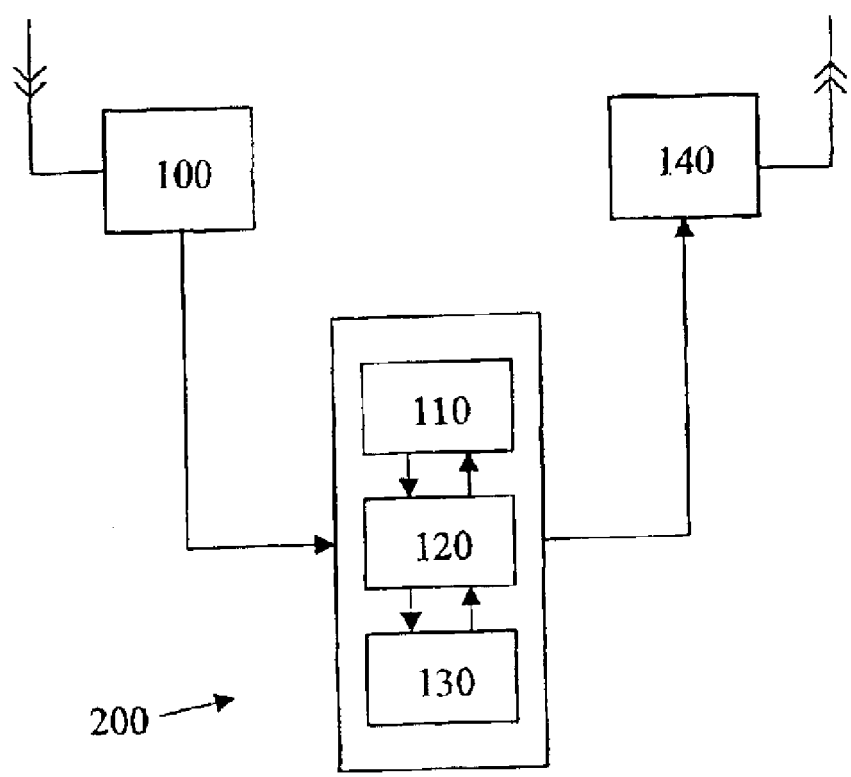
FIG. 2 is a schematic block diagram of an apparatus configured according to the present invention.

FIG. 2 schematically shows an apparatus configured according to one embodiment of the present invention. It includes a first means 100 for determining a current position P of the object which is preferably a GPS receiving and evaluating unit. The position data are supplied to a data processing unit 200. This unit 200 has a second 110, third 120 and fourth means 130.

The second means 110 is a memory means for storing previous positions which have been determined as waypoints.

The third means 120 is provided for determining a current distance D of the object from a previous waypoint W and for determining a current deviation A between a current traveling direction and a previous traveling direction of the object. The previous direction is preferably established by the connection of the last two stored waypoints. Further, the third means 120 is preferably provided for determining the current speed of the object.

The fourth means 130 is provided for comparing the current distance D and the current deviation A with at least one set of parameters X, Y, Z, which define criteria for storing a position as a new waypoint, and, if the criteria are fulfilled, for actually storing the current position P in the second means 110 (memory) as a new waypoint W.

Preferably, the fourth means 130 is also provided for comparing the current speed with a predetermined minimum speed S and for storing the current position P as a new waypoint W if, as an additional prerequisite, the current speed is above the minimum speed S.

Preferably, more than one limit speed L1, L2, . . . and more than one set of parameters (X1, Y1, Z1), (X2, Y2, Z2), . . . is provided. In this case, the fourth means 130 is preferably provided for comparing the current speed with the at least one limit speed L1; L2; . . . and for applying one of the sets of parameters (X1, Y1, Z1); (X2, Y2, Z2); . . . in dependence of which of the limit speeds (L1; L2; . . . ) the current speed of the object is below or above.

Finally, a transmitting means 140 is provided for transmitting the stored waypoints to a remote station for indicating and/or displaying the position and/or the traveling direction of the object.

The selection of waypoints shall be described with reference to FIG. 3. The continuous line indicates the traveled route of the object, the point P is the current position of the object. The point W0 and W1 is a first and a second waypoint, respectively. D denotes the current distance along the road between the second (last) waypoint W1 and the actual position P, whereas X and Y are parameters indicating a predetermined value of distance from the last waypoint which is the second waypoint W1 in FIG. 3, and A is a deviation between the current traveling direction of the object and the direction established by the connection of the last two waypoints W0 and W1.

In the following description, a value which is "currently" determined shall be denoted with an index "x", whereas such value which has been determined before the current value shall be denoted with an index "x−1" and so on.

First, a current position Px and a current distance Dx of the object from a previous position Px−1 which has been stored as a waypoint Wx−1 is determined. Then, a current deviation Ax between a current traveling direction and a previous traveling direction of the object is determined. The previous traveling direction is preferably, according to FIG. 3, the direction of the line which connects the last two stored waypoints W0 (generally Wx−2) and W1 (generally Wx−1).

The criteria for selecting and storing a current position Px as a new waypoint Wx are as follows: (1) The current distance Dx of the position Px along the road from the previous waypoint Wx−1 is greater than a first parameter X; OR (2)(a) The current distance Dx of the position Px along the road from the previous waypoint Wx−1 is greater than a second parameter Y, wherein Y<X, AND (2)(b) the deviation Ax between the current and previous traveling directions of the object is greater than a third parameter Z, AND (2)(c) the speed of the object is greater than a minimum speed which is a fourth parameter S. If one of the conditions (1) or (2a–c) is fulfilled, then the current position Px of the object is stored as a new waypoint Wx. Preferably, the last seven waypoints are stored in the memory and are used for displaying the traveled route of the object.

Criterium (1) makes sure that waypoints are taken at least at a certain interval even while traveling on a road which is substantially straight. Criterium (2a) maintains a smaller distance between waypoints if according to criterium (2b) a highway turns or a road in a city has corners and roundabouts. The speed S according to criterium (2c) is a lower speed limit to make sure that while traveling very slow, for example in parking areas, waypoints are not taken even if the other criteria (2a) and (2b) are fulfilled. However, the criterium (2c) is optional and can be deleted if the route does not lead through such areas in which speed has to be very low.

Figure 3:
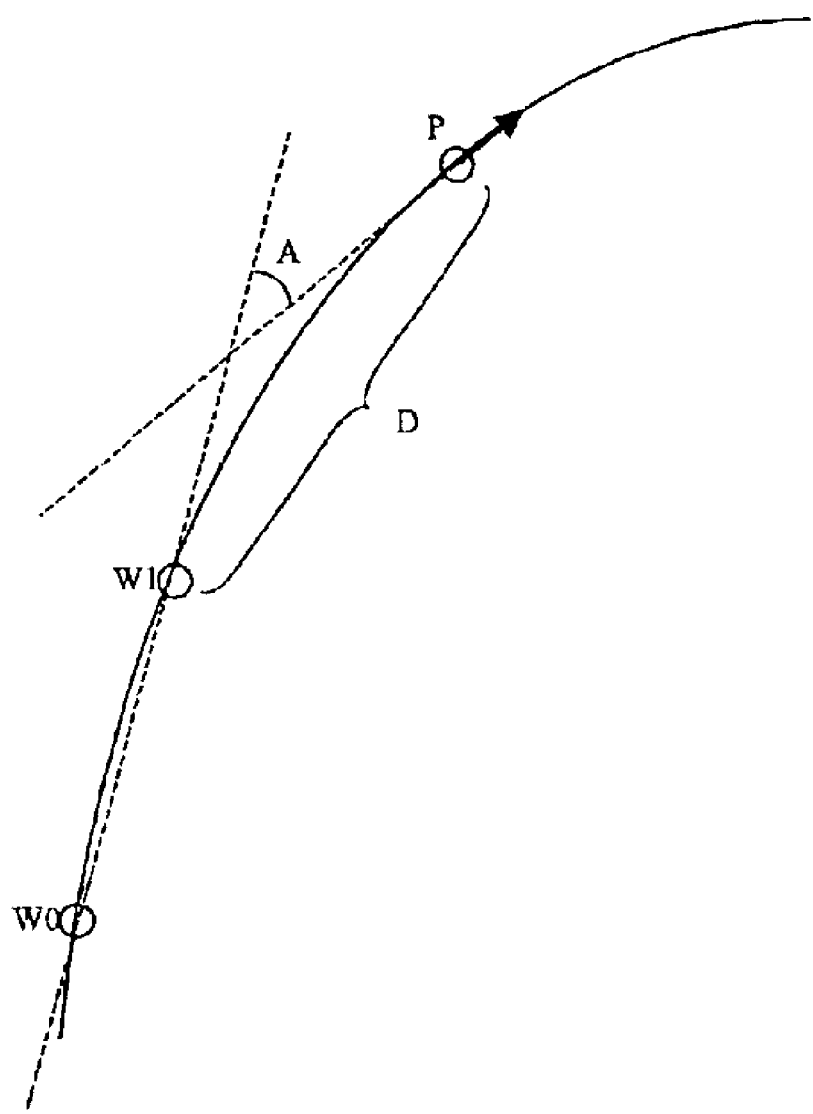
FIG. 3 is a schematic view illustrative of the selection of waypoints.

In the example of FIG. 3, the current position P is marked and stored as a new waypoint, if the speed of the object is above the minimum speed S, and if its distance D from the second waypoint W1 is greater than Y and if the deviation angle A is bigger than Z degrees. If one or more of these criteria have still not been fulfilled, when the object reaches the distance X from the second waypoint W1, a new waypoint is taken anyway. The current speed of the object and its distance D as well as the deviation angle A are evaluated on the basis of GPS data and compared according to the above criteria and stored by means of an evaluation unit comprising a memory unit inside the object.

The parameters (X, Y, Z) are predetermined in dependence of the speed of the object in comparison to a limit speed L. In case of a vehicle which is normally driving in a city or on highways with common speed ranges, one limit speed L is sufficient.

The limit speed L is chosen to distinguish between city traffic and traffic on highways so that an appropriate value could be about 50 km/h. Consequently, a first set of parameters (X1, Y1, Z1) for speeds below the limit speed L and a second set of parameters (X2, Y2, Z2) for speeds above the limit speed L is fixed. Various testing with numerous different routes has revealed preferred values for the first set of parameters as of (500 m, 50 m, 45°) and for the second set of parameters as of (1000 m, 100 m, 45°). The minimum speed S was set to 5 km/h.

Although the angle deviation Z was set to be 45° in both speed ranges, the value for Z should ideally be predetermined somewhat minor in the speed range above the limit speed L and somewhat larger in the speed range below the limit speed L especially because in cities, many turns are full 90° street corners. However, 45° seems at present to be a fairly good compromise for both speed ranges.

However, more than one speed limit L1; L2; . . . and accordingly more than two sets of parameters (X1, Y1, Z1); (X2, Y2, Z2); . . . can be predetermined and applied wherein the current speed is compared with those limit speeds.

Preferably, the last seven waypoints are stored in the memory and transmitted to a remote station (service center) if necessary. At the service center, the waypoints are transferred into a road map or indicated on a display showing an electronic map. The latest waypoint shows the latest position of the car, whereas the order of all waypoints indicates the traveling direction so that the position of the car even with respect to two parallel one-way lanes on a road or highway can be localized.

Figure 4:
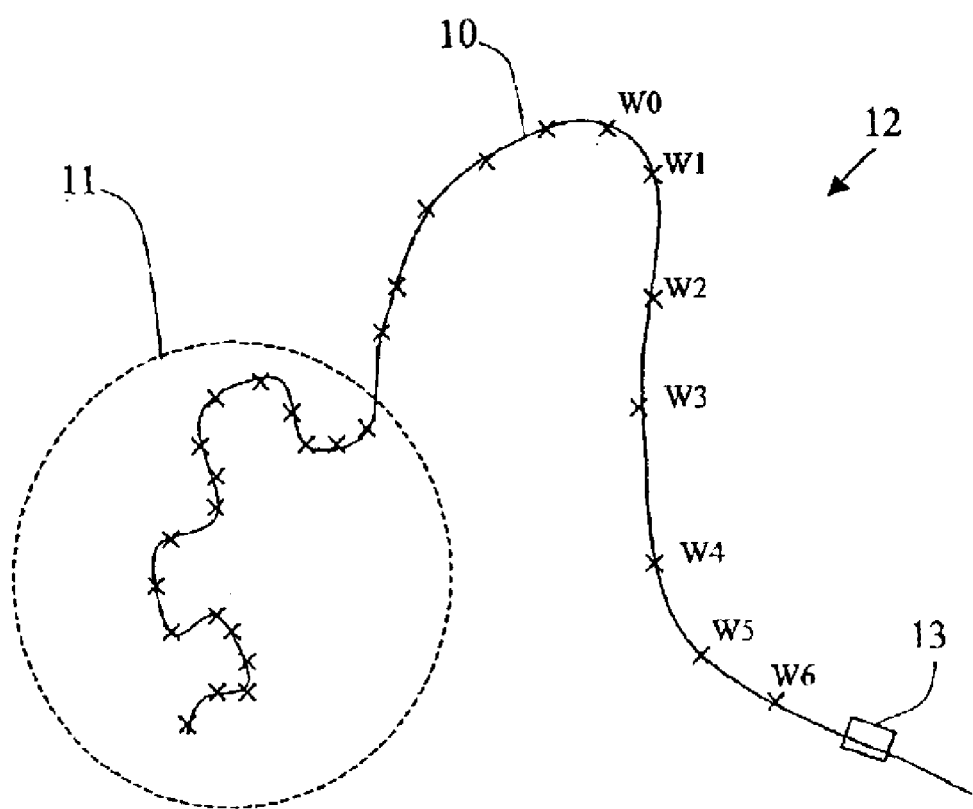
FIG. 4 is a chart of a route of travel of a vehicle in which selected waypoints are indicated.

FIG. 4 is a schematic illustration of a map, indicated at a remote station, with a road 10 running through a city 11 and the surrounded countryside 12. A vehicle 13 travels along the road. The previous positions of the vehicle which have been selected as waypoints according to the invention are each indicated with a cross. The last seven waypoints W0 to W6 are stored in the memory of the evaluation unit inside the vehicle.

These waypoints may be transmitted to, for example, the service center at a predetermined event. This event may be an accident which is detected with an appropriate sensor in the vehicle. It is also possible for the service center to transmit a special signal to the vehicle that will enable the vehicle to transmit the waypoints. The transmission of waypoints can also be manually initiated by, for instance, operating a switch in the vehicle.

FIG. 4 shows how several waypoints are grouped at narrower turns in the city and how the distance between waypoints increases with speed as the trip goes out to the countryside on a more straight path.

The steps of the inventive method are preferably written as a computer program code which is stored in and run on a data processing unit like a computer.

What is claimed is:

1. A method for determination of positions of a moving object, said method comprising the step of:

determining a current distance (Dx) of the object from a previous position (Px–1) which has been stored as a waypoint (Wx–1);

determining a current deviation (Ax) between a current traveling direction and a previous traveling direction which is evaluated on the basis of at least one previous waypoint;

comparing the current distance (Dx) and the current deviation (Ax) with at least one set of parameters (X, Y, Z) which define criteria for storing a position as a new waypoint;

determining and storing the current position (Px) as a new waypoint (Wx) if the criteria are fulfilled; and repeating the above steps and storing a predetermined number of last waypoints (Wx, Wx–1, Wx–2, . . . ) for indicating position and/or traveling direction of the object.

2. The method as recited in claim 1, wherein the criteria are defined as fulfilled if:

(1) the current distance (Dx) is greater than the first parameter (X); OR (2a) the current distance (Dx) is greater than the second parameter (Y) wherein Y<X; AND (2b) the deviation (Ax) between the current traveling direction and the direction established by the connection of the last two waypoints (Wx–1, Wx–2) is greater than the third parameter (Z).

3. The method as recited in claim 2, wherein the criteria are defined as fulfilled if, in combination with condition (2b), (2c) the speed of the object is greater than a predetermined minimum speed S.

4. The method as recited in claim 1, further comprising the following steps:

determining the current speed of the object and comparing the current speed with at least one limit speed (L1; L2; . . . ); and applying one of a plurality of predetermined sets of parameters [(X1, Y1, Z1); (X2, Y2, Z2); . . . ] in dependence of which of the limit speeds (L1; L2; . . . ) the current speed of the object is below or above.

5. The method as recited in claim 1, further comprising the following steps:

transmitting the predetermined number of last waypoints (Wx, Wx–1, Wx–2, . . . ) at a predetermined event.

6. An arrangement for determination of position of a moving object, said arrangement comprising:

a first means (100) for determining a current position (Px) of the object; a second means (110) for storing previous positions (Px–1, Px–2, . . . ) of the object as waypoints (Wx–1, Wx–2, . . . );

a third means (120) for determining a current distance (Dx) of the object from a previous waypoint (Wx–1) and for determining a current deviation (Ax) between a current traveling direction and a previous traveling direction of the object; and a fourth means (130) for comparing the current distance (Dx) and the current deviation (Ax) with at least one set of parameters (X, Y, Z), which define criteria for storing a position as a new waypoint, and, if the criteria are fulfilled, for storing the current position (Px) in the second means (110) as a new waypoint (Wx).

7. The arrangement as recited in claim 6, wherein the third means (120) is provided for additionally determining the current speed of the object, and the fourth means (130) is provided for additionally comparing the current speed with a predetermined minimum speed (S) and for storing the current position (Px) as a new waypoint (Wx) if, as an additional prerequisite, the current speed is above the minimum speed (S).

8. The arrangement as recited in claim 7, wherein the fourth means (130) is provided for comparing the current speed with at least one limit speed (L1; L2; . . . ) and for applying one of a plurality of predetermined sets of parameters [(X1, Y1, Z1); (X2, Y2, Z2); ... ] in dependence of which of the limit speeds (L1; L2; ... ) the current speed of the object is below or above.

9. The arrangement as recited in claim 6, further comprising:
a transmitting means (140) for transmitting said stored waypoints (Wx-1, Wx-2, ... ) to a remote station for indicating and/or displaying the position and/or the traveling direction of the object.

10. The arrangement as recited in claim 6, wherein the first means (100) is a GPS receiver, and the second to fourth means (110 to 130) are implemented in a data processing unit (200) comprising a memory and a computer program code, said computer program code adapted to determine positions of a moving object by conducting the following steps:
determining a current distance (Dx) of the object from a previous position (Px-1) which has been stored as a waypoint (Wx-1);
determining a current deviation (Ax) between a current traveling direction and a previous traveling direction which is evaluated on the basis of at least one previous waypoint;
comparing the current distance (Dx) and the current deviation (Ax) with at least one set of parameters (X, Y, Z) which define criteria for storing a position as a new waypoint;
determining and storing the current position (Px) as a new waypoint (Wx) if the criteria are fulfilled; and
repeating the above steps and storing a predetermined number of last waypoints (Wx, Wx-1, Wx-2, ... ) for indicating position and/or traveling direction of the object.

11. A method for determination of positions of a moving object, said method comprising the step of:
determining a current distance (Dx) of the object from a previous position (Px-1) which has been stored as a waypoint (Wx-1);
determining a current deviation (Ax) between a current traveling direction and a previous traveling direction which is evaluated on the basis of at least one previous waypoint;
comparing the current distance (Dx) and the current deviation (Ax) with at least one set of parameters (X, Y, Z) which define criteria for storing a position as a new waypoint;
determining and storing the current position (Px) as a new waypoint (Wx) if the criteria are fulfilled;
repeating the above steps and storing a predetermined number of last waypoints (Wx, Wx-1, ... Wx-2, ... ) for indicating position and/or traveling direction of the object;
determining the current speed of the object and comparing the current speed with at least one limit speed (L1; L2; ... ); and
applying one of a plurality of predetermined sets of parameters [(X1, Y1, Z1); (X2, Y2, Z2; ... ] in dependence of which of the limit speeds (L1; L2; ... ) the current speed of the object is below or above.

* * * * *